United States Patent [19]

Balas

[11] Patent Number: 4,567,251

[45] Date of Patent: Jan. 28, 1986

[54] CATALYST PASSIVATION PROCESS

[75] Inventor: Jaroslav C. Balas, Houston, Tex.

[73] Assignee: Shell Oil Company, Houston, Tex.

[21] Appl. No.: 578,167

[22] Filed: Feb. 8, 1984

Related U.S. Application Data

[63] Continuation-in-part of Ser. No. 392,834, Jun. 28, 1982, abandoned.

[51] Int. Cl.$^4$ ............................. C08F 6/08; C08F 8/04
[52] U.S. Cl. ..................................... 528/487; 528/483
[58] Field of Search ......................................... 528/487

[56] References Cited

U.S. PATENT DOCUMENTS 3,793,306 2/1974 Farrar ................................. 528/493
4,395,356 7/1983 Slaugh ................................. 528/487

*Primary Examiner*—Christopher A. Henderson
*Attorney, Agent, or Firm*—Peter A. Bielinski

[57] ABSTRACT

The present invention involves a method of treating solutions of hydrogenated conjugated diene polymers contaminated with residues of nickel hydrogenation catalysts, wherein the solutions are first oxidized and then contacted with a ligand which readily forms a stable nickel compound.

4 Claims, No Drawings

CATALYST PASSIVATION PROCESS

BACKGROUND OF THE INVENTION

This application is a continuation-in-part of application Ser. No. 392,834, filed June 28, 1982, now abandoned.

1. Field of the Invention

The invention relates to a process for treating catalyst residues. In particular, the invention relates to a process for treating solutions of polymers containing nickel hydrogenation catalyst residues.

2. Description of the Prior Art

The hydrogenation of unsaturated polymers is well-known in the art. Usually a solution of polymer in an inert solvent is contacted at elevated temperature with hydrogen under pressure in the presence of a metal catalyst, which is often a transition metal catalyst such as nickel, cobalt, iron, platinum and the like. Specific hydrogenation techniques are described in British Pat. No. 1,020,720 and U.S. Pat. No. 4,156,673. Nickel is a particularly useful and efficient hydrogenation catalyst, especially in the form of nickel compounds activated by special reduction methods.

Unsaturated polymers are hydrogenated or otherwise treated for a variety of reasons, frequently using a nickel catalyst. The presence of olefinic unsaturation in the polymers make them susceptible to oxygen attack and to deterioration by actinic radiation. Further, saturation of olefinic unsaturation greatly improves environmental stability and may even improve color. However, a common problem shared by the many types of hydrogenated polymers is the deleterious effect of nickel catalyst remaining after hydrogenation. The quantity of metal to be removed may be as high as 5 weight percent, although substantially smaller amounts usually are present. The nickel residues discolor the polymer product, and may cause polymer deterioration by promoting reactions with air and actinic radiation. Accordingly, these nickel residues must be removed to very low levels.

Removal of catalyst residues by filtration may be carried on first to remove much of the catalyst, but residual contamination is very difficult to remove by purely physical separation. Accordingly, chemical reaction and separation have been required in the past. Furthermore, especially with highly viscous polymer solutions, filtration often is an impractical means of removing even gross amounts of nickel.

One of the early methods of removing nickel catalyst residues was described in U.S. Pat. No. 2,893,982, where the polymer was treated with a carboxylic acid or a mineral acid. Another method described in U.S. Pat. No. 3,531,448, involved treating the catalyst-containing polymer solution with an aqueous solution of an ammonium phosphate prior to separation. Still another catalyst removal processes are described in U.S. Pat. Nos. 3,780,137 and 3,780,138, where the polymer solutions are treated, respectively, with carbon monoxide or citric acid.

All of these previous methods of treating polymer solutions to remove nickel catalyst residues have drawbacks. In some cases, the treating agents, such as strong mineral acids, are corrosive to the equipment used and, unless removed completely, may be deleterious to the hydrogenated polymer from which the nickel is being removed. Furthermore, in the prior art methods an aqueous phase is typically necessary, which must be intimately mixed with the organic phase containing the hydrogenated polymer, then separated cleanly to remove the dissolved nickel ions. Such separation can often be a tedious process because of slow or incomplete separation of the two phases, e.g., because of emulsion formation.

A new process for treating hydrogenated polymer solutions containing nickel catalyst residues has been found, which new process eliminates many of the above-mentioned problems.

SUMMARY OF THE INVENTION

The present invention involves a method for treating solutions of hydrogenated polymers containing nickel catalyst residues without the necessity of physically or chemically removing the nickel residues. Instead, the nickel catalyst residues are complexed or passified in such a manner that they do not become deleterious to the recovered polymer. In fact, by use of the present method, it is possible to prepare polymers having much improved thermal and oxidative stability. Specifically, the present invention is a method of treating solutions of hydrogenated polymers or copolymers of conjugated dienes, said solutions being contaminated with residues of nickel hydrogenation catalyst comprising nickel in zero valence state, said method comprising:

(a) oxidizing said nickel residues to a higher valence state; and (b) contacting the resulting oxidized nickel residues with a ligand capable of forming Ni chelates which are inert in redox reactions or are capable of catalyzing the decompositions of hydroperoxides only through non radical-forming mechanisms.

As shown in the detailed description and the examples, the present invention has a number of advantages. Not only do the polymers prepared according to the present invention have much improved thermal and oxidative stability, it may not be necessary in some cases to add conventional stabilizers in the amounts now required, therein saving costs. Further, lower capital costs may be required for new plants since it is not necessary to have such elaborate or complete catalyst removal facilities. Further, there would be lower operating costs, less corrosion problems and less effluent to deal with compared to the standard acid treating process now commerically used.

DETAILED DESCRIPTION OF THE INVENTION

Polymers may become contaminated with nickel or nickel compounds in several ways. Incidental or accidental contamination may occur, from contact with reaction vessels or piping made from metals containing nickel, such as stainless steel or Inconel. Polymerization using nickel compounds as in the preparation of polybutadiene with nickel/aluminum type catalyst systems, or hydrogenation of polymers using nickel catalysts or other processes will generate polymers containing small amounts of deleterious nickel that must be removed. The nickel contained in all of these polymers will be passivated by the method of this invention, and the invention is not limited by the previous history of the polymers or by the mode whereby the nickel contaminant entered the polymer.

The method of this invention is very useful in passivating either gross or trace amounts of nickel from unsaturated polymers that have been hydrogenated in the presence of a nickel catalyst. Among the unsaturated polymers that may be hydrogenated to products suitable for treatment by the method of this invention are homopolymers made from open chain conjugated dienes having from 4 to 8 carbon atoms per molecule, preferably 4 to 6 carbon atoms per molecule and various types (e.g., block or random) of copolymers of these conjugated dienes with vinyl arenes. Preferred dienes are butadiene and isoprene. the term "vinyl arene" as used herein is intended to include styrene, ring substituted styrenes and species having alkyl substituents on the vinyl group in the alpha position such as alpha methyl styrene.

The homopolymers, random copolymers and block copolymers can be made by processes well known in the art. Free radical polymerization of unsaturated hydrocarbon monomers is discussed at length in Whitby's book "Synthetic Rubber" and in hundreds of patents and scientific papers. Block copolymers are the subject of many patents and numerous scientific papers. References that describe polymerization techniques for block polymers are U.S. Pat. Nos. 3,231,635; 3,301,840; 3,465,063; and 3,281,383.

These unsaturated polymers may be hydrogenated partially, or selectively, or completely by techniques known to the art, using finely divided metals as catalyst and hydrogen under pressure and elevated temperature. The catalyst may be for example, nickel or kieselguhr, Raney nickel, and the like. It will be understood that it is not important to this invention how the metal catalyst was made. With these catalysts hydrogenation may be partial or complete, in the sense that all or part of the double bonds in the unsaturated polymers are saturated.

A particularly useful type of metal catalyst is made by reducing a metal compound or chelate of nickel with an aluminum containing reducing agent. Preference is given to hydrogenation catalysts obtained by causing an aluminum trialkyl (e.g., aluminum triethyl (Al(Et)$_3$) or aluminum triisobutyl) to react with a nickel salt of an organic acid (e.g., nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g., nickel acetonylacetonate, the nickel salt of butylacetophenone).

A much preferred hydrogenation process is the selective hydrogenation process shown in Wald et al, U.S. Pat. No. 3,595,942, which disclosure is herein incorporated by reference. In that process, hydrogenation is conducted, preferably in the same solvent in which the polymer was prepare,d utilizing a catalyst comprising the reaction product of an aluminum alkyl and a nickel carboxylate or alkoxide. A favored catalyst is the reaction product formed from triethyl aluminum and nickel octoate.

Suitable precursor polymers include linear and branched configurations having individual polymer blocks such as polybutadiene, polyisoprene, polystyrene or poly alpha-methylstyrene. Typical species include polystyrene-polyisoprene, polystyrene-polybutadiene-polystyrene and poly(alpha-methylstyrene)-polyisoprene-poly(alpha-methylstyrene).

Typical completely hydrogenated polymers containing metal catalysts that benefit from the method of this invention are hydrogenated polybutadiene, hydrogenated polyisoprene, completely hydrogenated random styrene-butadiene copolymers, completely hydrogenated vinyl arene-diene block copolymers, described in U.S. Pat. Nos. 3,333,024 and 3,431,323, and completely hydrogenated all-diene block copolymers, described in U.S. Pat. No. 3,465,063. Suitable hydrogenation conditions and catalysts are described in Canadian Pat. No. 815,575.

Hydrogenation may be conducted under the usual conditions known to the art, as represented especially by U.S. Pat. No. 3,595,942 and British Pat. No. 1,020,720.

When hydrogenation is finished, the metal catalyst residue remains in the water-immiscible inert solvent, usually a hydrocarbon, used for the hydrogenation. The hydrogenated polymer may be in solution, or it may be partially precipitated if the polymer structure is such that is partially crystallizes; for example, a hydrogenated polystyrene-polyisoprene-polystyrene is soluble in a cyclohexane hydrogenation solvent, but a hydrogenated cis 1,4 polybutadiene is a crystalline polyethylene that may be only partly soluble at room temperature. Aliphatic, cycloaliphatic and aromatic solvents may be used. Cyclohexane is a preferred solvent.

The amount of nickel present in the polymer solution is typically between about 10,000 and about 10 parts per million (weight), preferably between about 1,000 and about 50 ppm.

The nickel catalyst residues in the polymer solution are believed to be int he zero valence state. Accordingly, the first step of the present invention involves oxidizing the nickel residues to a higher valence state, i.e., a +2 valence state.

Oxidation of the nickel residues to a higher valence state can be accomplished by a number of different methods, such methods being within the scope of one skilled in the art. Such methods include, by way of illustration, contacting the polymer solution with air or oxygen alone, air and ammonia in combination, air and acid in combination or acid alone. Acids include specifically phosphoric, citric and sulfuric acid. Typically, one would employ greater than stoichiometric amounts of oxidizing agent. However, the level of deliberate oxidation required depends in part upon the ligand selected. Conditions for oxidizing are typically those employed in the hydrogenation, e.g., temperatures of 60° C. to 90° C. If desired the oxidizing step can take place in the absence of water.

The next step involves contacting the resulting polymer solution containing the oxidized nickel residues with a ligand which readily forms a stable nickel compound. Without wishing to be bound to any particular theory, it is considered that the particular ligand should be selected such that the readily formed nickel compound will not catalyze the decomposition of hydroperoxides to free-radical species. Thus in reaction equations I and II below, the nickel compound was not stable and redox behavior resulted ("M" representing nickel):

BAD

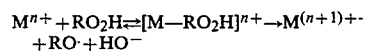

I

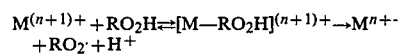

II

As shown in reaction equation III, it would be desirable if the nickel ligand components were simply inert ("L" representing the ligand):

GOOD

ML₂+ROOH→No reaction     III

It would be most desirable, though not necessary, if the nickel ligand complex were able to catalyze the decomposition of hydroperoxides by a non-radical mechanism. Then the nickel ligand would act as a stabilizer, as shown in reaction equations V-VIII:

BETTER $$ML_2 + ROOH \rightleftharpoons [RO_2ML_2]^\ominus H^\oplus \quad V$$

$$[RO_2ML_2]^\ominus H^+ + ROOH \rightleftharpoons [ML_2]^{2\ominus} 2H^\oplus + ROOR + O_2 \quad VI$$

$$[ML_2]^{2\ominus} 2H^\oplus + ROOH \rightleftharpoons [RO\ ML_2]^\ominus H^\oplus H_2O \quad VII$$

$$[RO\ ML_2]^\ominus H^\oplus + ROOH \rightleftharpoons ML_2 + H_2O + ROOR \quad VIII$$

As shown in the "Good" and "Better" examples above the valence state of nickel is fixed and the nickel cannot participate in redox reactions or in the "better" example the nickel can only catalyze the decomposition of hydroperoxides through a non radical-forming mechanism. As for the selection of particular ligands, the following five structures are representative of resulting stable nickel-ligand structures:

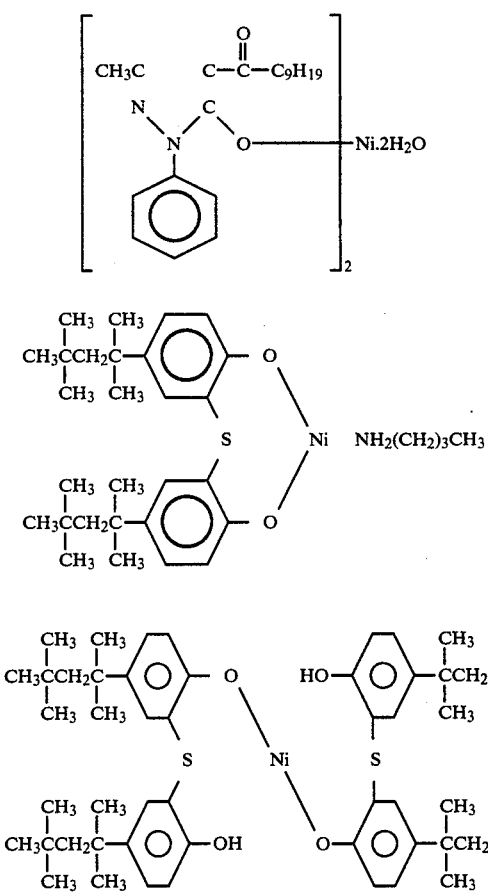

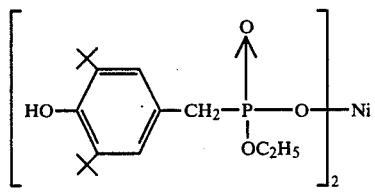

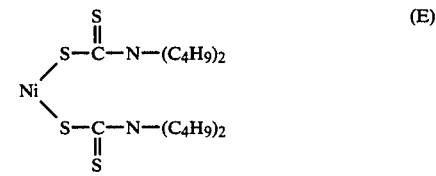

Specifically, complex D results when the ligand employed is a salt of bis(O-ethyl(3,5 di-tert-butyl-4-hydroxybenzyl))phosphonic acid. In a particular embodiment, the ligand employed was potassium bis(O-ethyl(3,5 di-tert-butyl-4-hydroxybenzyl)phosphonate, therein resulting in a structure similar to (D) above. In another specific embodiment, sodium dibutyldithiocarbamate was employed as the ligand to prepare the complex corresponding to (E) above.

As for the reaction conditions needed to form the stable nickel-ligand complexes, temperatures of about 0° C. to about 200° C. are preferred, with temperatures of about 15° C. to about 100° C. being more preferred. Sufficient contacting of the ligand with the nickel residues is obtained through normal stirring techniques. Regarding the amount of ligand required, typically the amount of ligand added is in excess of stoichiometric. Also, since in some cases aluminum may be present in the polymer solutions, it may be necessary to add additional amounts of ligand to react with the aluminum. With some of the desirable ligands, such as sodium dibutyldithiocarbamate, pH is not important. However, with others it may be desirable to have a basic pH, i.e., 7 to 9. To adjust pH, ammonia is less desirable than sodium hydroxide since ammonia may compete with the ligand.

After the nickel residues have been passified according to the present invention, the polymer is typically recovered from the solvent by methods known in the art, such as the method described in U.S. Pat. No. 3,804,145.

The invention is further described by reference to the following illustrative embodiments, which are presented for illustration only, and are not meant to limit the invention to the particular reactants and conditions employed therein.

ILLUSTRATIVE EMBODIMENT I

In illustrative Embodiment I, a styrene-butadiene-styrene block copolymer was selectively hydrogenated with a nickel octoatetriethyl aluminum catalyst according to U.S. Pat. No. 3,595,942. The hydrogenated polymer cement contained about 60 ppm nickel and was divided into two portions. One portions was employed as a control, and the solvent was merely removed by standard finishing techniques. The other portion was treated according to the present invention.

According to the present invention, 2.2% weight concentrated NH₄OH was added to one portion. This was then sparged with a gaseous mixture of 3% O₂/97% N₂ at 65° C., while stirring the mixture at about 1800 rpm. A sample was taken and centrifuged, resulting in two phases. The polymer cement phase contained 0.4 ppm Ni while the aqueous phase contained 2680 ppm Ni. This indicated that the nickel had been effectively oxidized to a higher valence state. Next a quantity of sodium dibutyl-dithiocarbamate (NaBC) was added to the oxidized portion. The amount added was 150 percent by weight of stoichiometric, basis nickel content. A green color formed rapidly in the cement, therein indicating the formation of nickel dibutyldithiocarbamate (NiBC), which has a strong green color. A centrifuged sample revealed that the cement phase had a Ni content of 73 ppm while the aqueous phase had a Ni content of 1 ppm. This was a further indication of the formation of NiBC, which is soluble in the cement phase. Next, the polymer was recovered by typical finishing techniques.

ILLUSTRATIVE EMBODIMENT II

In illustrative Embodiment II a comparison oven aging test was performed between the control sample and the sample according to the invention, both being prepared in Illustrative Embodiment I. The two polymers were compounded according to the same formulation:

| | |
|---|---|
| base polymer | 100 parts by weight |
| compounding oil | 100 parts by weight |
| polypropylene | 15 parts by weight |
| Irganox 1010 | 0.1 parts by weight |

Irganox 1010 is tetrakis[methylene 3-(3',5'-di-tert-butyl-4'-hydroxyphenyl)propionate]methane.

Both compounded samples were placed on hooks in an oven maintained at a temperature of 120° C. After less than one day the control sample crumbled and fell off the hook. However, the sample according to the present invention was still elastic and had not fallen off the hook after 14 days (when the test was discontinued). This comparison graphically illustrates the significant stabilizing effect obtained in polymers treated according to the present invention.

What is claimed is:

1. A method of treating solutions of hydrogenated polymers or copolymers of conjugated dienes, said solutions being contaminated with residues of nickel hydrogenation catalysts comprising nickel in the zero valence state, said method comprising:
   (a) oxidizing said nickel residues to a higher valence state; and
   (b) contacting the resulting oxidized nickel residues with a ligand selected from the group consisting of sodium dibutyldithiocarbamate, bis(O-ethyl(3,5 di-tert-butyl-4-hydroxybenzyl))phosphonic acid and potassium bis(O-ethyl(3,5 di-tert-butyl-4-hydroxybenzyl)phosphonate, which is capable of formng Ni chelates which are inert in redox reactions or are capable of catalyzing the decomposition of hydroperoxides only through nonradical-forming mechanisms.

2. The method of claim 1 wherein the oxidizing of step (a) comprises contacting said solution with ammonium hydroxide and oxygen.

3. The method of claim 1 wherein said oxygen is in the form of air.

4. The method of claim 1 wherein said solution is a solution of an inert solvent and a selectively hydrogenated styrene-butadiene block copolymer.

* * * * *

UNITED STATES PATENT AND TRADEMARK OFFICE
CERTIFICATE OF CORRECTION

PATENT NO. : 4,567,251
DATED : January 28, 1986
INVENTOR(S) : Jaroslav G. Balas

It is certified that error appears in the above-identified patent and that said Letters Patent are hereby corrected as shown below:

On the Title Page, Inventor, the name "Jaroslav C. Balas" should read -- Jaroslav G. Balas --.

Signed and Sealed this

Second Day of September 1986

[SEAL]

*Attest:*

*Attesting Officer*

DONALD J. QUIGG

*Commissioner of Patents and Trademarks*